United States Patent
Heck et al.

(10) Patent No.: US 7,938,239 B2
(45) Date of Patent: May 10, 2011

(54) CLUTCH ASSEMBLY WITH RESTRAINING PLATE AND METHOD FOR ASSEMBLING A CLUTCH ASSEMBLY

(75) Inventors: Thomas Heck, Wooster, OH (US); Steven Olsen, Wooster, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 792 days.

(21) Appl. No.: 11/900,073

(22) Filed: Sep. 10, 2007

(65) Prior Publication Data

US 2008/0060895 A1    Mar. 13, 2008

Related U.S. Application Data

(60) Provisional application No. 60/843,841, filed on Sep. 12, 2006.

(51) Int. Cl.
    *F16H 45/02*    (2006.01)
(52) U.S. Cl. .............. 192/3.28; 192/70.19; 192/109 R
(58) Field of Classification Search ............... 192/70.16, 192/70.22
    See application file for complete search history.

(56) References Cited

U.S. PATENT DOCUMENTS

| | | | |
|---|---|---|---|
| 4,534,457 A * | 8/1985 | Eltze et al. ................. | 192/70.19 |
| 4,867,641 A | 9/1989 | Okuno et al. | |
| 4,951,788 A * | 8/1990 | Martin ........................ | 192/3.29 |
| 5,388,678 A | 2/1995 | Murata | |
| 6,953,112 B2 | 10/2005 | Miura | |
| 7,040,469 B2 | 5/2006 | Shirataki et al. | |
| 2004/0112699 A1 | 6/2004 | Prater et al. | |
| 2007/0048082 A1 | 3/2007 | Hoffmann et al. | |
| 2007/0224046 A1 | 9/2007 | Wang et al. | |

FOREIGN PATENT DOCUMENTS

DE    19755168    6/1999
JP    3-144153 A *    6/1991

* cited by examiner

*Primary Examiner* — Rodney H Bonck
(74) *Attorney, Agent, or Firm* — Simpson & Simpson, PLLC

(57) ABSTRACT

A clutch assembly for a torque converter including: a plurality of annular friction elements; a pressure plate; and a restraining plate engageable with a portion of the plurality of annular friction elements and arranged to limit axial movement of a portion of the annular friction elements to a maximum distance from the pressure plate. In some aspects, the restraining plate is rotationally connected to the pressure plate. In some aspects, the pressure plate includes an axial protrusion arranged to limit the axial movement of the plurality of annular friction elements away from the pressure plate. In some aspects, the clutch assembly includes a plate radially overlapping the restraining plate to limit the axial movement of the plurality of annular friction elements away from the pressure plate.

16 Claims, 13 Drawing Sheets

CLUTCH ASSEMBLY WITH RESTRAINING PLATE AND METHOD FOR ASSEMBLING A CLUTCH ASSEMBLY

CROSS-REFERENCE TO RELATED APPLICATIONS

This application claims the benefit under 35 U.S.C. §119 (e) of U.S. Provisional Application No. 60/843,841 filed Sep. 12, 2006.

FIELD OF THE INVENTION

The invention relates generally to torque converters and, more specifically, to a clutch assembly that is axially restrained without the use of a torque converter cover.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

By rotationally connected, or secured, we mean that the two components in question are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

FIG. 7 shows an alternative embodiment of torque converter clutch 49 of FIGS. 5-6. FIG. 7 shows a triple plate clutch, clutch assembly 100, adjacent to cover 11, further comprising rivet 102 to secure together flange 13, springs 15, cover plate 16, and piston plate 17. Clutch plates 110 comprises three clutch plates and plate 116 rotationally connected to cover 11 at spline 118. Plate 112 has an axial segment that protrudes through slot 114, rotationally connecting clutch plates 110 to piston plate 17.

In some aspects, cover 11 is variable in shape and design between different automobiles and automobile manufactures. Additionally, cover 11 may be manufactured in a separate location than clutch 100. There are no support features securing clutch plate assembly 110 axially to clutch 100. Thus, prior to cover 11 being installed, clutch plates 110 will easily slide axially out of clutch 100. As a result, clutch plates 110 and clutch 100 are typically shipped as separate parts to the manufacturer installing cover 11. Thus, additional steps are needed to handle and assembly the separate components, increasing manufacturing cost, time, and complexity.

Thus, there has been a long felt need for clutch plate assemblies to be axially secured in a clutch without requiring the installation of a torque converter cover.

BRIEF SUMMARY OF THE INVENTION

The present invention broadly comprises a clutch assembly for a torque converter including: a plurality of annular friction elements; a pressure plate; and a restraining plate engageable with at least a portion of the plurality of annular friction elements and arranged to limit axial movement of at least a portion of the annular friction elements to a maximum distance from the pressure plate. In some aspects, the restraining plate is rotationally connected to the pressure plate. In some aspects, the pressure plate includes an opening and the restraining plate includes an axial segment disposed in the opening and arranged to contact the pressure plate to limit the axial movement of at least a portion of the plurality of annular friction elements away from the pressure plate. In some aspects, the pressure plate includes a radial surface and the axial segment includes an end arranged to contact the radial surface to limit the axial movement of at least a portion of the plurality of annular friction elements or the axial segment is radially biased to limit the axial movement of at least a portion of the plurality of annular friction elements. In some aspects, the axial segment is biased radially inward.

In some aspects, the pressure plate includes an axial protrusion arranged to limit the axial movement of at least a portion of the plurality of annular friction elements away from the pressure plate. In some aspects, the restraining plate is rotationally connected to the axial protrusion. In some aspects, the axial protrusion includes a rivet with a head arranged to limit the axial movement of at least a portion of the restraining plate away from the pressure plate. In some aspects, the axial protrusion is disposed radially outside of the plurality of annular friction elements or the axial protrusion is disposed radially inside of the plurality of annular friction elements. In some aspects, the axial protrusion is integral to the pressure plate or the axial protrusion is formed separately from the pressure plate and connected to the pressure plate.

In some aspects, the clutch assembly includes a plate radially overlapping the restraining plate to limit the axial movement of at least a portion of the plurality of annular friction elements away from the pressure plate. In some aspects, the plate includes at least one first interlocking feature and the restraining plate includes at least one second interlocking feature rotationally connected with the at least one first interlocking feature. In some aspects, the plate is rotationally connected to the pressure plate.

In some aspects: the torque converter includes a cover and a friction element in the plurality of annular friction elements is arranged to frictionally engage the cover; the clutch assembly includes a plate engaged with at least a portion of the plurality of annular friction elements and the torque converter includes a cover and the plate is arranged to rotationally connect to the cover; or the plurality of annular friction elements includes a plurality of clutch plates.

The present invention also broadly comprises a clutch assembly for a torque converter including: a plurality of annular friction elements; a pressure plate including an opening; and, a restraining plate engageable with at least a portion of the plurality of annular friction elements and having an axially disposed segment with an end. The axially disposed segment is disposed in the opening to rotationally connect the restraining plate and the pressure plate and the end is arranged to contact the pressure plate to limit an axial movement of at least a portion of the plurality of annular friction elements away from the pressure plate.

The present invention further broadly comprises a clutch assembly for a torque converter including: a plurality of annular friction elements; a pressure plate; a rivet connected to the pressure plate; and a restraining plate engageable with at least a portion of the plurality of annular friction elements, rotationally connected to the rivet, and arranged to limit an axial movement of at least a portion of the plurality of annular friction elements away from the pressure plate. The rivet is arranged to limit an axial movement of the restraining plate away from the pressure plate.

The present invention broadly comprises a clutch assembly for a torque converter including: a plurality of annular friction elements; a pressure plate; a restraining plate engageable with at least a portion of the plurality of annular friction elements and having a first interlocking feature; and a plate rotationally connected to the pressure plate, radially overlapping the restraining plate, and having a second interlocking feature rotationally connected to the first interlocking feature. The restraining plate is arranged to restrict axial movement of at least a portion of the annular friction elements away from the pressure plate and the plate is arranged to limit an axial movement of the restraining plate away from the pressure plate.

The present invention also broadly comprises a method for assembling a clutch assembly for a torque converter including: engageably disposing a restraining plate with at least a portion of a plurality of annular friction elements; inserting an axial protrusion for the restraining plate through an opening in a pressure plate to rotationally connect the restraining plate and the pressure plate; and configuring the axial protrusion to limit axial movement of at least a portion of the plurality of annular friction elements away from the pressure plate to a first distance. In some aspects, the pressure plate includes a radial surface, the axial segment includes an end, and configuring the axial protrusion to limit axial movement of at least a portion of the plurality of annular friction elements includes radially bending the end to contact the radial surface after the restraining plate axially displaces a second distance. In some aspects, configuring the axial protrusion to limit axial movement of at least a portion of the plurality of annular friction elements includes radially biasing the axial protrusion. In some aspects, radially biasing the axial protrusion includes biasing radially inward.

It is a general objective of the present invention to provide a clutch assembly for a torque converter that is substantially secured, while allowing for axial play, to the torque converter prior to installing the torque cover.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
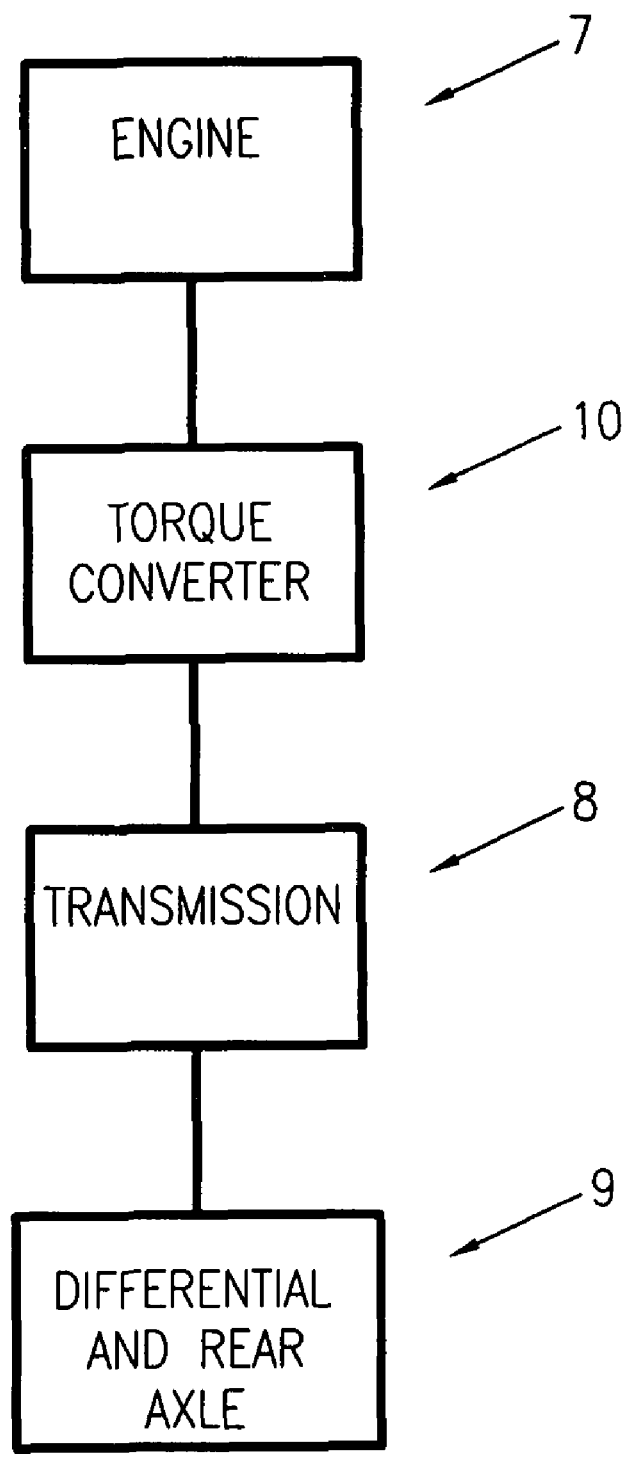
FIG. 1 is a general block diagram illustration of power flow in a motor vehicle, intended to help explain the relationship and function of a torque converter in the drive train thereof.
Figure 2:
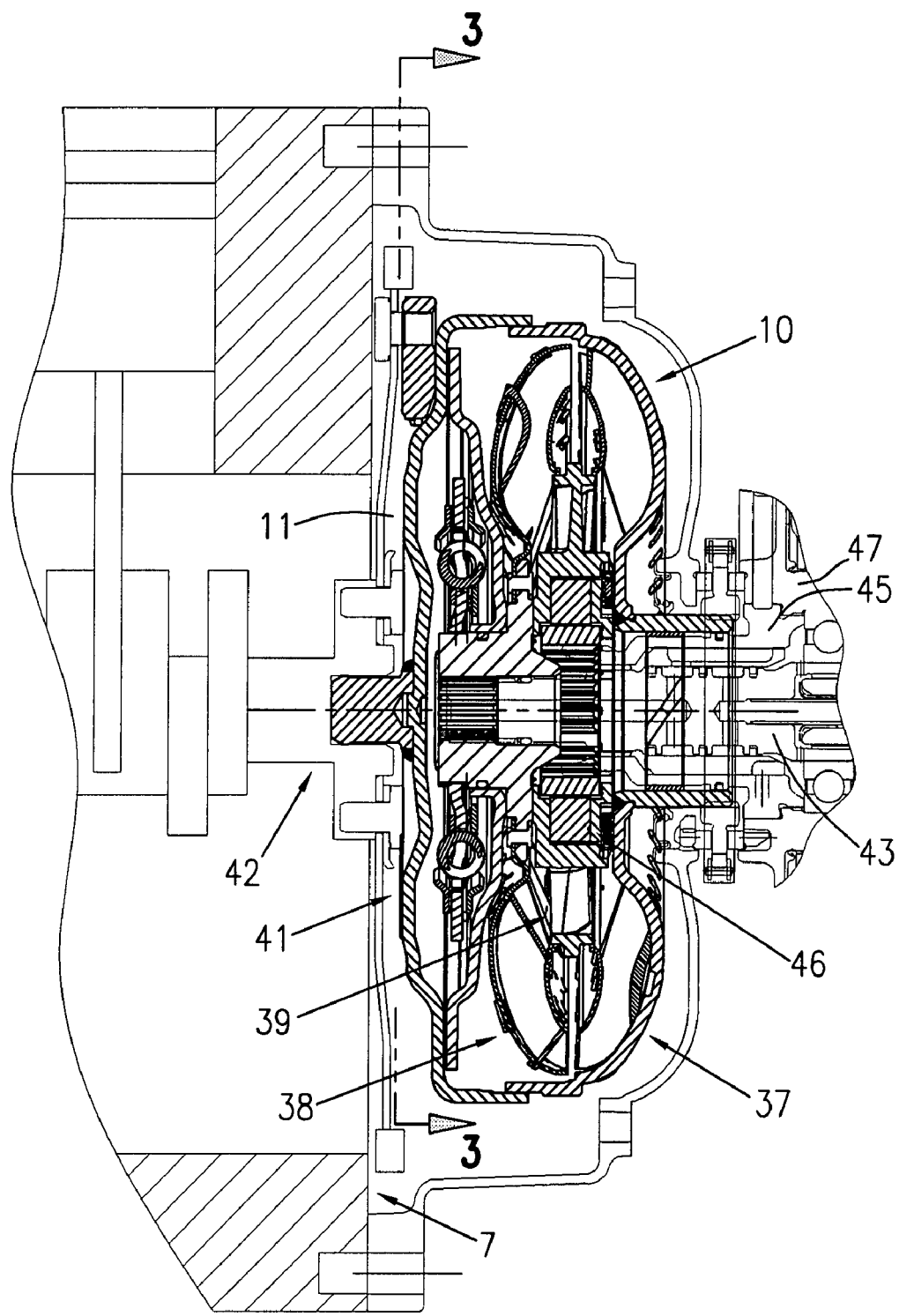
FIG. 2 is a cross-sectional view of a prior art torque converter, shown secured to an engine of a motor vehicle.
Figure 3:
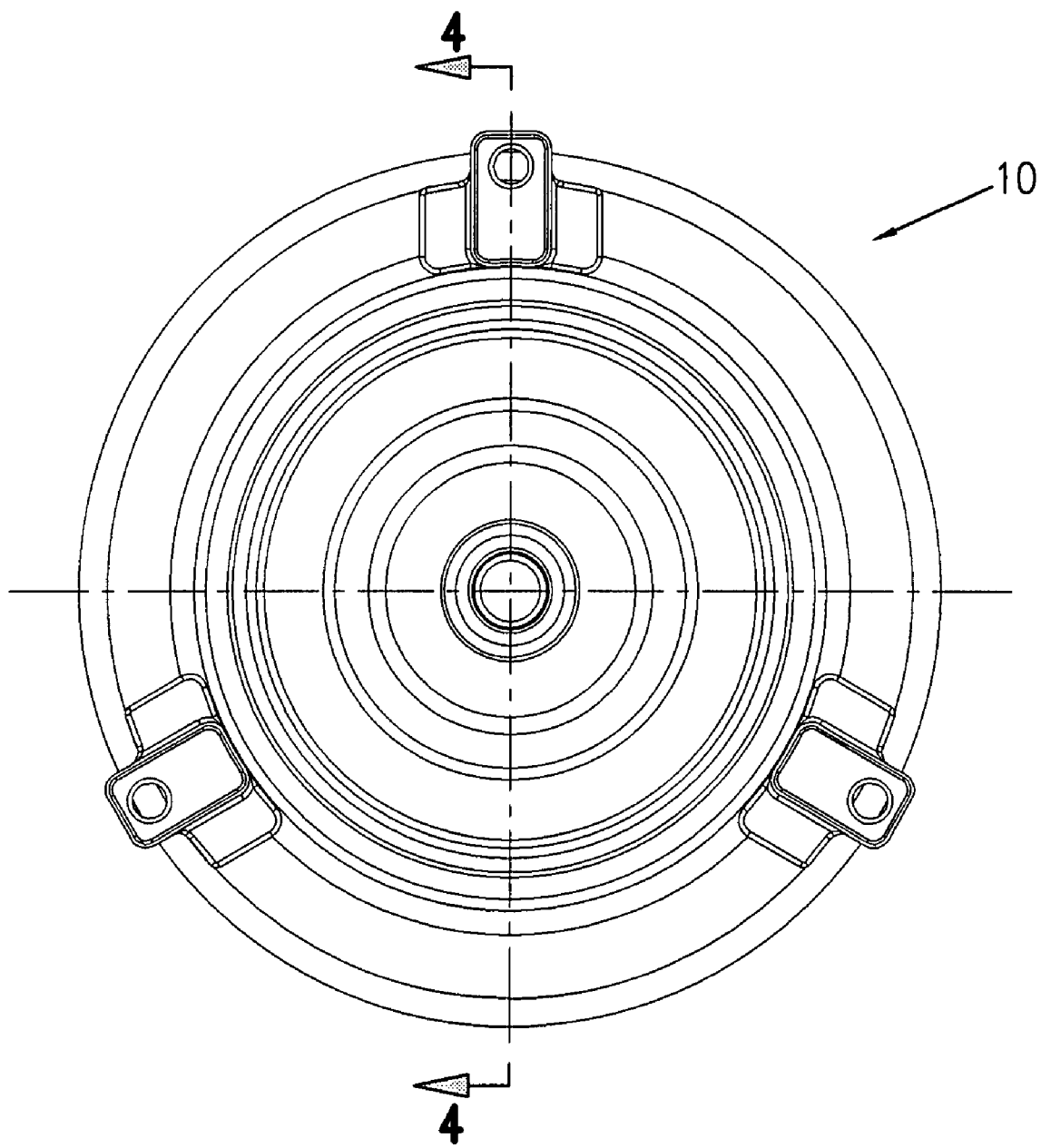
FIG. 3 is a left view of the torque converter shown in FIG. 2, taken generally along line 3-3 in FIG. 2.
Figure 4:
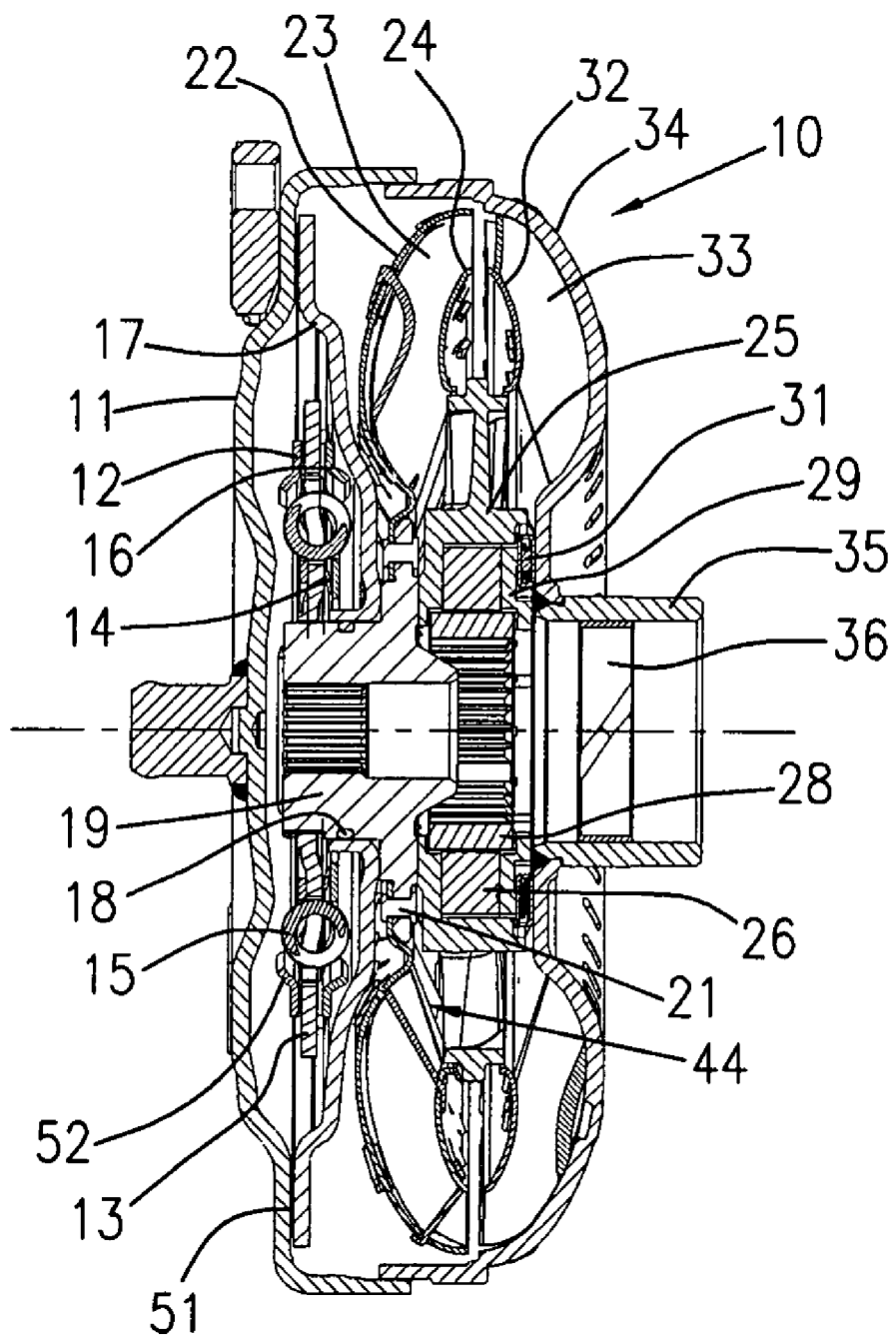
FIG. 4 is a cross-sectional view of the torque converter shown in FIGS. 2 and 3, taken generally along line 4-4 in FIG. 3.
Figure 5:
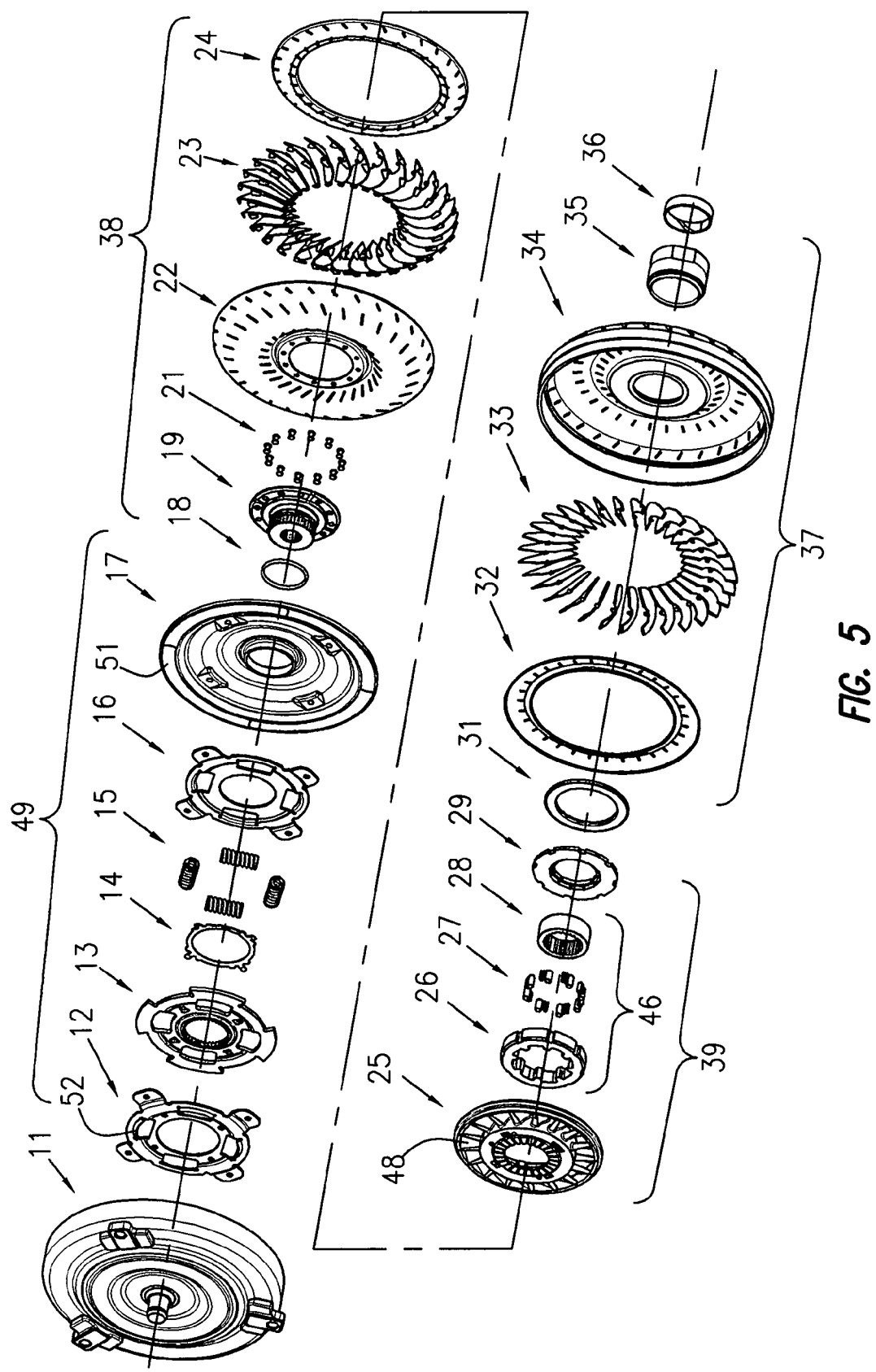
FIG. 5 is a first exploded view of the torque converter shown in FIG. 2, as shown from the perspective of one viewing the exploded torque converter from the left.
Figure 6:
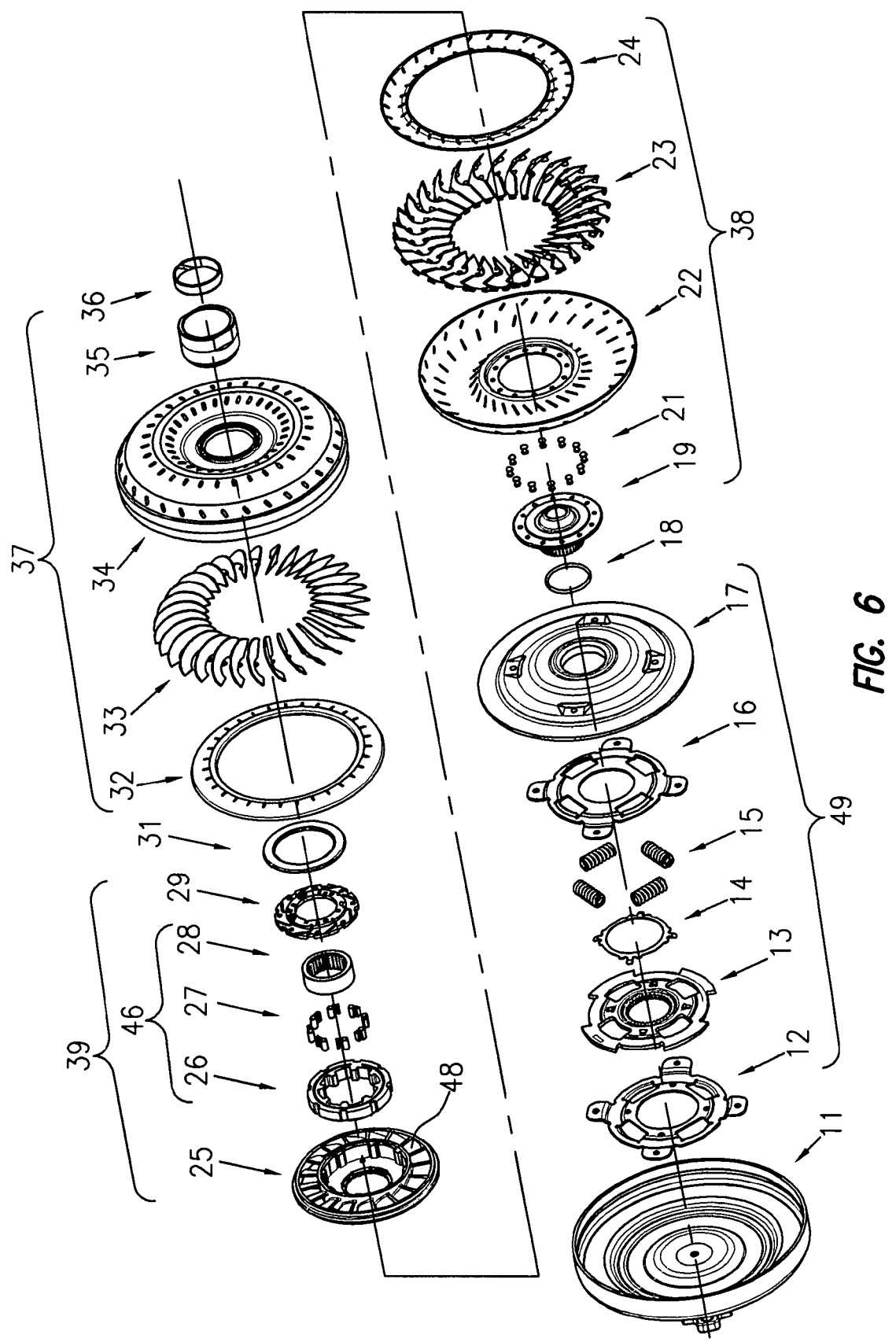
FIG. 6 is a second exploded view of the torque converter shown in FIG. 2, as shown from the perspective of one viewing the exploded torque converter from the right.
Figure 7:
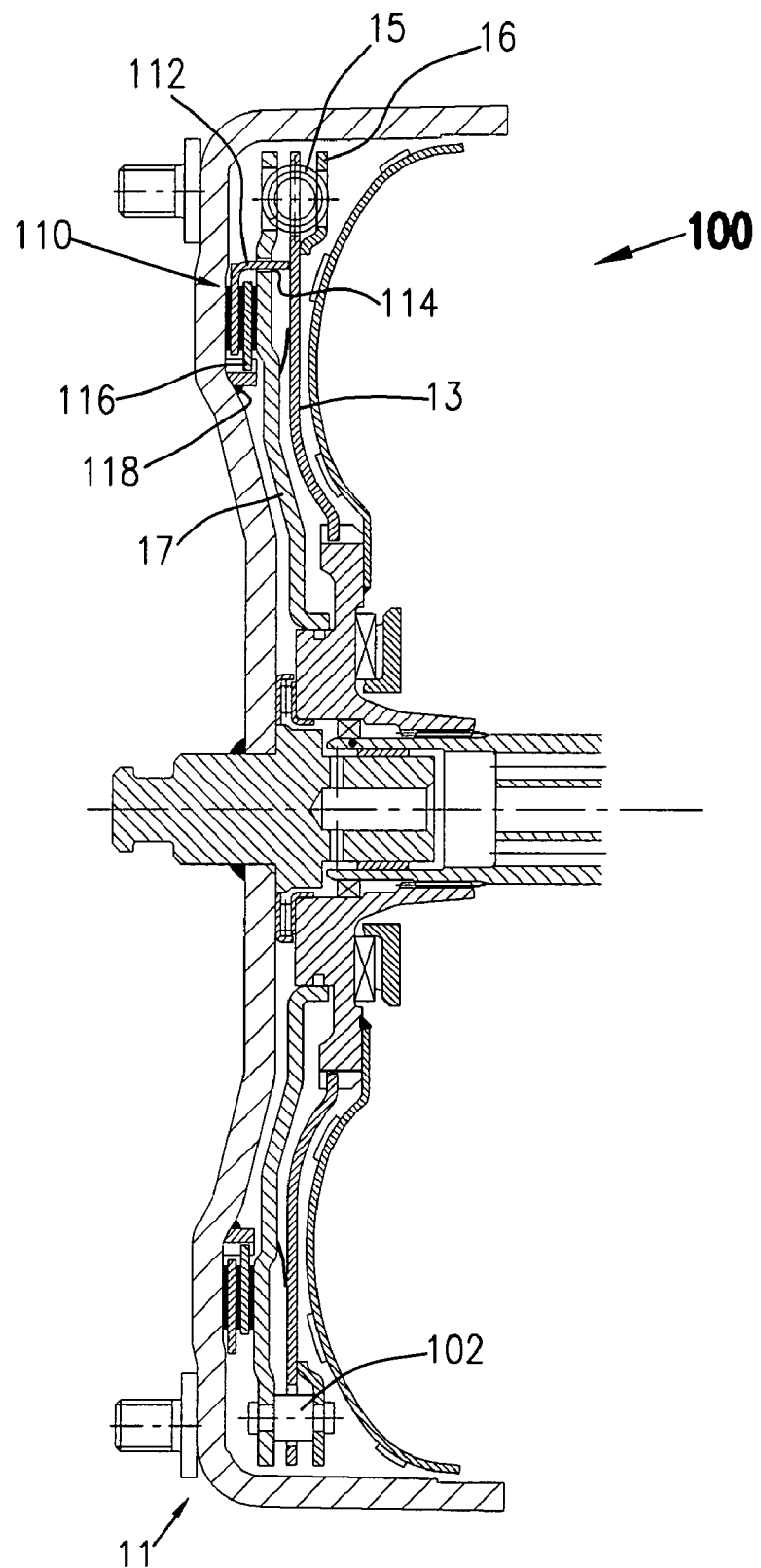
FIG. 7 is a cross sectional view of a triple plate clutch and cover.
Figure 8:
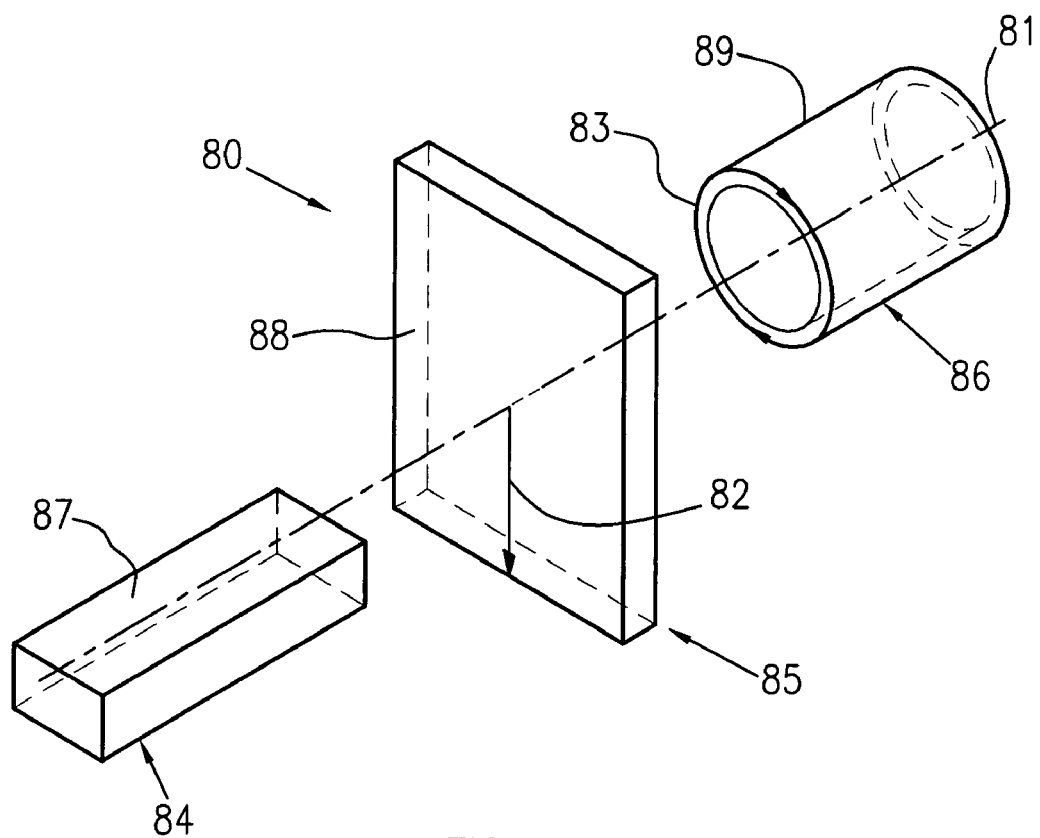
FIG. 8 is a perspective view of a cylindrical coordinate system demonstrating spatial terminology used in the present application.

FIG. 8 is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 9:
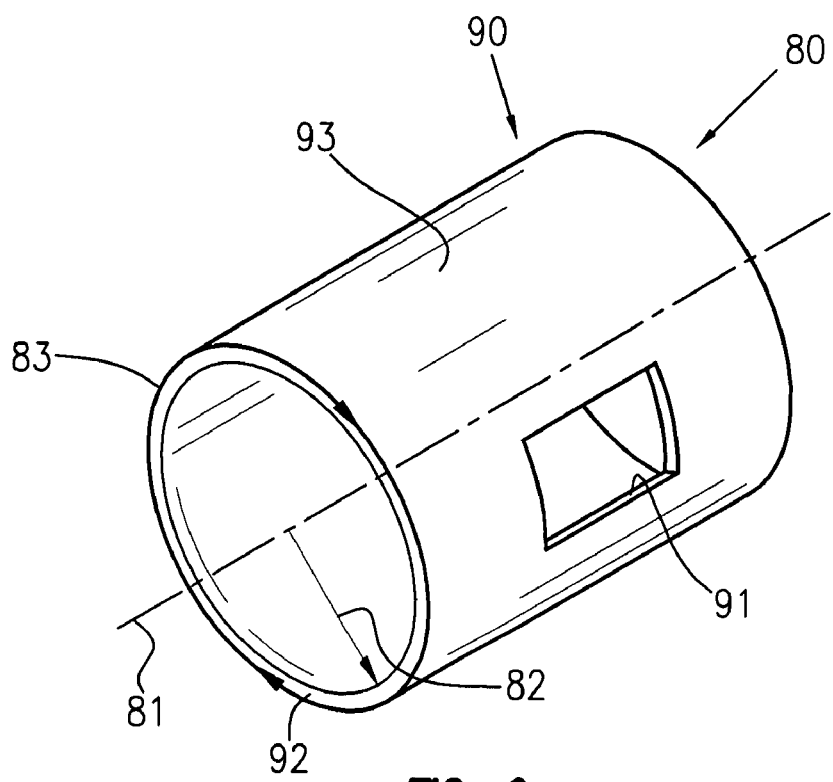
FIG. 9 is a perspective view of an object in the cylindrical coordinate system of FIG. 8.

FIG. 9 is a perspective view of object 90 in cylindrical coordinate system 80 of FIG. 8 demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 10:
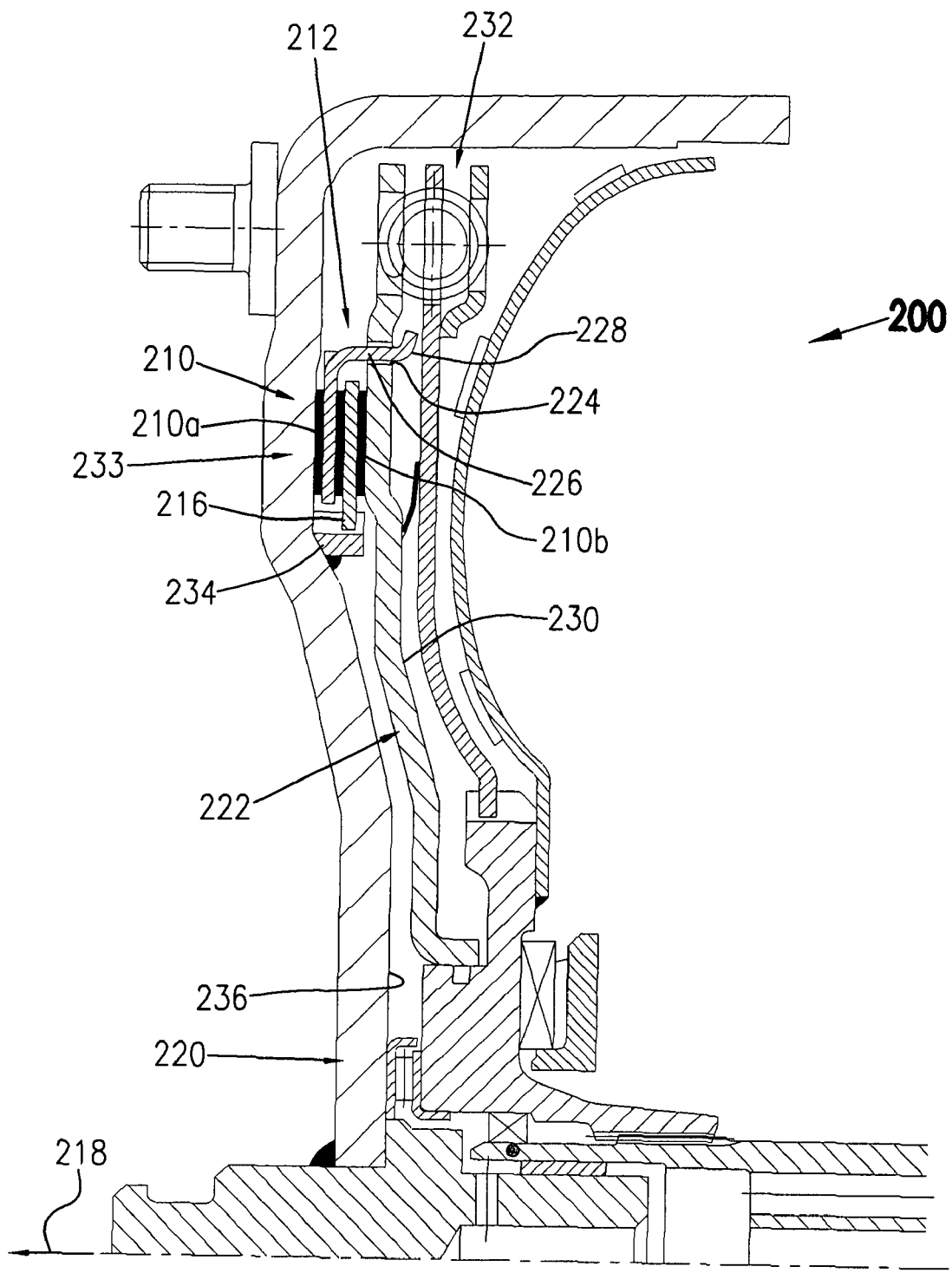
FIG. 10 is a cross sectional view of a present invention clutch assembly with a bent clip restraining plate.

FIG. 10 is a cross sectional view of a present invention clutch assembly, clutch assembly 200, with a bent clip restraining plate. Clutch assembly 200 comprises annular friction elements 210, restraining plate 212, and plate 216. Restraining plate 212 is engageable with a portion of annular friction elements 210, rotationally connected to plate 222, and is arranged to restrict axial movement of at least a portion of annular friction elements 210, in particular in axial direction 218, as described below. Plate 216 is engageable with a portion of annular friction elements 210 and arranged to rotationally connect to cover 220. Elements 210 can be any frictional elements known in the art. By engageable, we mean friction material is fixedly connected to a plate, for example, plate 212, or the plate is interleaved with the friction elements. By interleaved we mean the frictional elements are respective independent clutch plates between the plates. In some aspects, both fixedly secured and independent frictional elements are used. The preceding discussion of plates and friction material is applicable to the discussions that follow, and in the interest of brevity is not repeated.

In general, annular friction elements 210 are arranged to frictionally engage cover 220 and pressure plate 222. For example, element 210a is arranged to engage cover 220 and element 210b is arranged to engage plate 222 when plate 222 is displaced in direction 218.

The restraining plate is disposed in openings 224 and is arranged to contact the pressure plate to limit axial movement of the annular friction elements in direction 218 axially away from the pressure plate. Specifically, axial segments 226 of plate 212 extend through respective openings 224 in plate 222. The segments are radially bent so that end 228 is radially misaligned with openings 224. Thus, when plate 212 is sufficiently displaced in direction 218, ends 228 contact radial surface 230 of plate 222. Axial segment 226 is bent to axially restrain annular friction elements 210 in the direction away from pressure plate 222. Axial segment 226 is bent radially outwards, but it should be appreciated that axial segment 226 could be bent radially inwards. Axial segment 226 is typically bent after insertion through opening 224.

Thus, plate 212 restricts the axial movement of the annular friction elements and plate 216 while enabling sufficient axial movement for the operation of assembly 200. That is, to enable the friction elements to engage to create a torque transmission path from cover 220 to damper 232. Also plate 212 is arranged to restrict movement of the annular friction elements, axially away (in direction 218) from pressure plate 222, to a maximum distance. The maximum distance is at least partially determined by the axial length of segment 226. Alternately stated, the restraining plate is arranged to limit disposition of the annular friction elements to a maximum axial distance from the pressure plate. Hence, sub-assembly 233, which includes friction elements 210 and plates 212 and 216, is axially restrained with respect to plate 222 and remains intact without engagement to cover 220, enabling the shipment of plate 222 (and any other components to which it is connected) and sub-assembly 233 for later assembly with a separate torque converter cover.

It should be understood that not all axial segments need be radially bent. For example, a portion of the axial segments could be disposed in the pressure plate openings and not radially bent and the remainder of the axial segments could be disposed in the pressure plate openings and radially bent.

Plate 216 is arranged to rotationally connect to cover 220. In some aspects, interlocking feature, for example spline, 234 is located on inner surface 236 of the cover and plate 216 is formed to interlock with the spline. The spline can be connected to the cover by any means known in the art, including, but not limited to welding. It should be understood that any means known in the art can be used to rotationally connect plate 216 and cover 220.

Figure 11:
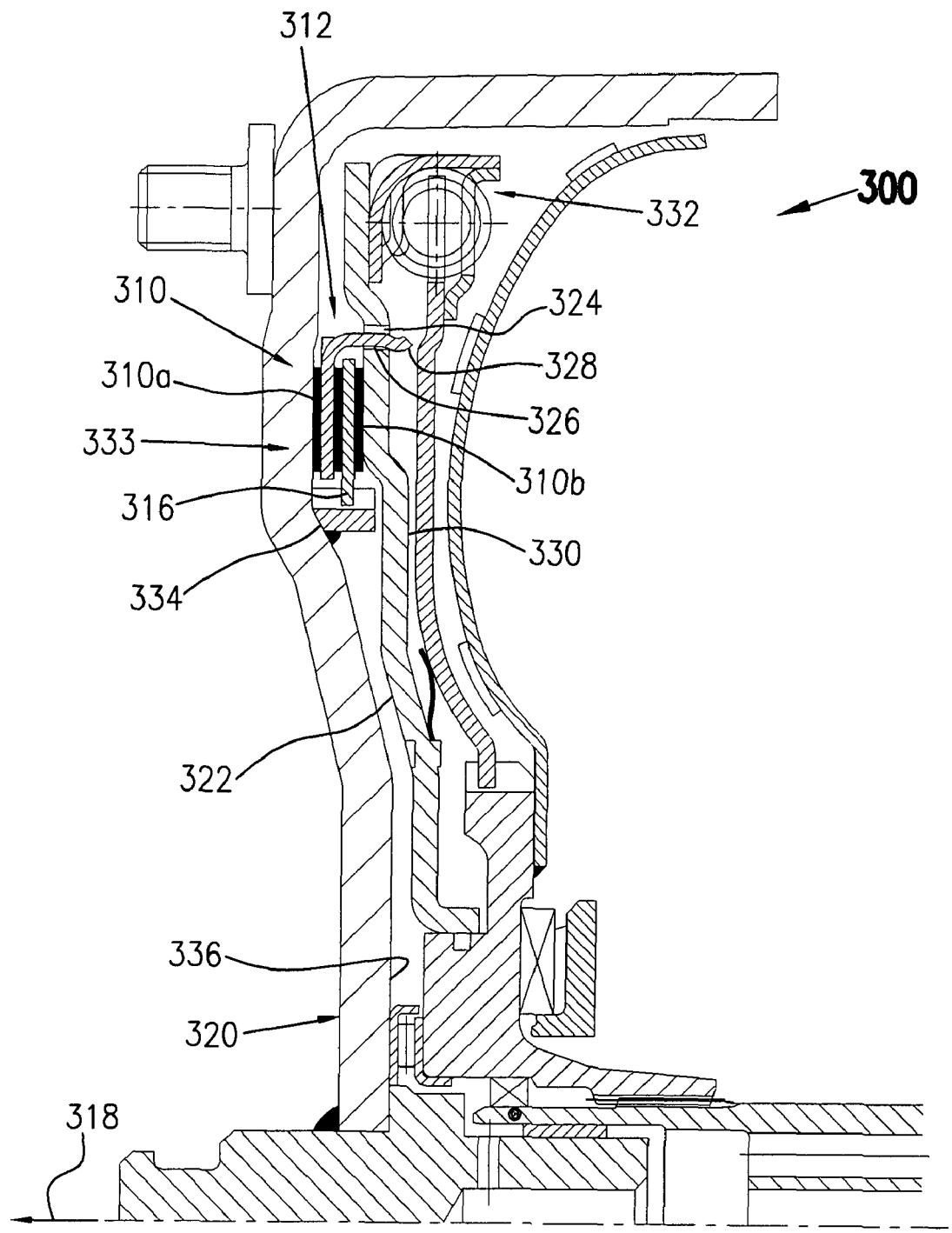
FIG. 11 is a cross sectional view of a present invention clutch assembly with a snap clip restraining plate.

FIG. 11 is a cross sectional view of a present invention clutch assembly, clutch assembly 300, with a snap clip restraining plate. Clutch assembly 300 comprises annular friction elements 310, restraining plate 312, and plate 316. Restraining plate 312 is engageable with a portion of annular friction elements 310, rotationally connected to plate 322, and is arranged to restrict axial movement of at least a portion of annular friction elements 310, in particular in axial direction 318, as described below. Plate 316 is engageable with a portion of annular friction elements 310 and arranged to rotationally connect to cover 320. The discussion regarding plates and friction material in the description of FIG. 10 is applicable to friction material 310 and plates 312 and 316.

In general, annular friction elements 310 are arranged to frictionally engage cover 320 and pressure plate 322. For example, element 310a is arranged to engage cover 320 and element 310b is arranged to engage plate 322 when plate 322 is displaced in direction 318.

The restraining plate is disposed in openings 324 and is arranged to contact the pressure plate to limit axial movement of the annular friction elements in direction 318 axially away from the pressure plate. Specifically, axial segments 326 of plate 312 extend through respective openings 324 in plate 322. The segments are radially bent, that is, biased radially, to limit the axial movement of the annular friction elements. In some aspects, the axial segments are biased radially inward. In some aspects (not shown), the axial segments are biased radially outward. Thus, axial segment 326 is configured as a snap-fit clip. Axial segment 326 has a substantially curved shape, is at least partially elastic, and is operatively arranged to engage slot 324. Upon engagement into slot 324, the bias of segment 326 is counteracted by contact with plate 322 until end, or snap-fit clip, 328 protrudes through slot 324. Snap-fit clip 328 then displaces in the direction of the bias once through the opening to axially restrain annular friction elements 310 with respect to pressure plate 322. In some aspects, axial segment 320 is curved and biased radially inwards. In some aspects (not shown), axial segment 320 is curved and biased in other directions, for example, radially outward.

Thus, plate 312 restricts the axial movement of the annular friction elements and plate 316 while enabling sufficient axial movement for the operation of assembly 300. That is, to enable the friction elements to engage to create a torque transmission path from cover 320 to damper 332. Also plate 312 is arranged to restrict movement of the of annular friction elements, axially away (in direction 318) from pressure plate 322, to a maximum distance. The maximum distance is at least partially determined by the axial length of segment 326. Alternately stated, the restraining plate is arranged to limit disposition of the annular friction elements to a maximum axial distance from the pressure plate. Hence, sub-assembly 333, which includes friction elements 310 and plates 312 and 316, is axially restrained with respect to plate 322 and remains intact without engagement to cover 320, enabling the shipment of plate 322 (and any other components to which it is connected) and sub-assembly 333 for later assembly with a separate torque converter cover.

It should be understood that not all axial segments need be radially biased. For example, a portion of the axial segments could be disposed in the pressure plate openings and not radially biased and the remainder of the axial segments could be disposed in the pressure plate openings and radially biased.

Plate 316 is arranged to rotationally connect to cover 320. In some aspects, interlocking feature, for example spline, 334 is located on inner surface 336 of the cover and plate 316 is formed to interlock with the spline. The spline can be connected to the cover by any means known in the art, including, but not limited to welding. It should be understood that any means known in the art can be used to rotationally connect plate 316 and cover 320.

Figure 12:
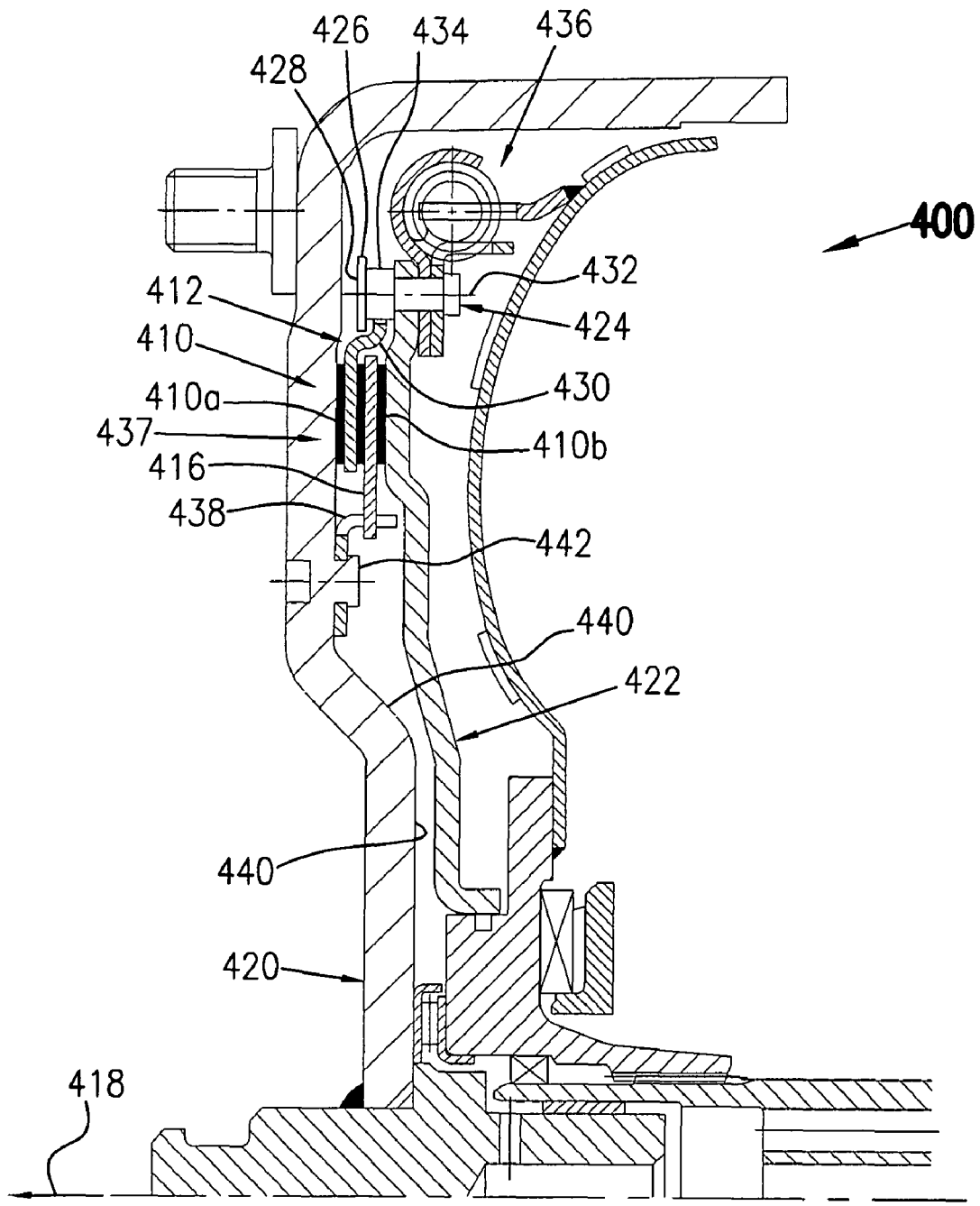
FIG. 12 is a cross sectional view of a present invention clutch assembly with an outer radial rivet restraining plate.

FIG. 12 is a cross sectional view of present invention clutch assembly 400 with an outer radial rivet restraining plate. Clutch assembly 400 includes annular friction elements 410, restraining plate 412, and plate 416. Restraining plate 412 is engageable with a portion of annular friction elements 410 and is arranged to restrict axial movement of at least a portion of annular friction elements 410, in particular in axial direction 418, as described below. Plate 416 is engageable with a portion of annular friction elements 410 and arranged to rotationally connect to cover 420. The discussion regarding plates and friction material in the description of FIG. 10 is applicable to friction material 410 and plates 412 and 416.

In general, annular friction elements 410 are arranged to frictionally engage cover 420 and pressure plate 422. For example, element 410a is arranged to engage cover 420 and element 410b is arranged to engage plate 422 when plate 422 is displaced in direction 418.

Assembly 400 includes axial protrusions 424 connected to pressure plate 422. The axial protrusions include limiting elements 426 at axial end 428. Protrusions 424, in particular limiting elements 426, are arranged to limit the axial movement of annular friction elements 410 axially away from pressure plate 422, that is, in direction 418. In some aspects, protrusions 424 are rivets and elements 426 are respective heads of rivets. In some aspects, the rivets are formed separately from the pressure plate and connected to the pressure plate. In some aspects (not shown), the rivets are formed integrally with the pressure plate, for example, the rivets are extruded from the pressure plate.

In some aspects, restraining plate 412 is rotationally connected to protrusions 424 by forming outer circumferential segment 430 to compliment the shape of the protrusions, for example, forming recesses in segment 430 which engage protrusions 424. In some aspects, restraining plate 412 is rotationally connected to protrusions 424 by forming outer circumferential segment 430 to extend radially between the protrusions so that segment 430 and the protrusions engage during rotation of the segment or protrusions.

The configuration of segment 430 enables plate 416 to axially displace along segment 434 of the protrusions. In some aspects (not shown), the restraining plate is not rotationally connected to the protrusions, but is axially limited by the protrusions. For example, segment 430 extends sufficiently radially outward so that the segment is radially aligned with elements 426 (elements 426 restrict axial displacement in direction 418), but segment 430 does not extend radially outward enough to rotationally engage the protrusions.

Thus, plate 412 restricts the axial movement of the annular friction elements and plate 416 while enabling sufficient axial movement for the operation of assembly 400. That is, to enable the friction elements to engage to create a torque transmission path from cover 420 to damper 436. Also plate 412 is arranged to restrict movement of the annular friction elements, axially away (in direction 418) from pressure plate 422, to a maximum distance. The maximum distance is at least partially determined by the axial length of segment 434. Alternately stated, the restraining plate is arranged to limit disposition of the annular friction elements to a maximum axial distance from the pressure plate. Hence, sub-assembly 437, which includes friction elements 410 and plates 412 and 416, is axially restrained with respect to plate 422 and remains intact without engagement to cover 420, enabling the shipment of plate 422 (and any other components to which it is connected) and sub-assembly 437 for later assembly with a separate torque converter cover.

Plate 416 is arranged to rotationally connect to cover 420. In some aspects, segment 438 is located on inner surface 440 of the cover and plate 416 is formed to rotationally connect with the segment. Segment 438 can be connected to the cover by any means known in the art, including, but not limited to rivet 442. In some aspects, rivet 442 is extruded. It should be understood that any means known in the art can be used to rotationally connect plate 416 and cover 420.

Figure 13:
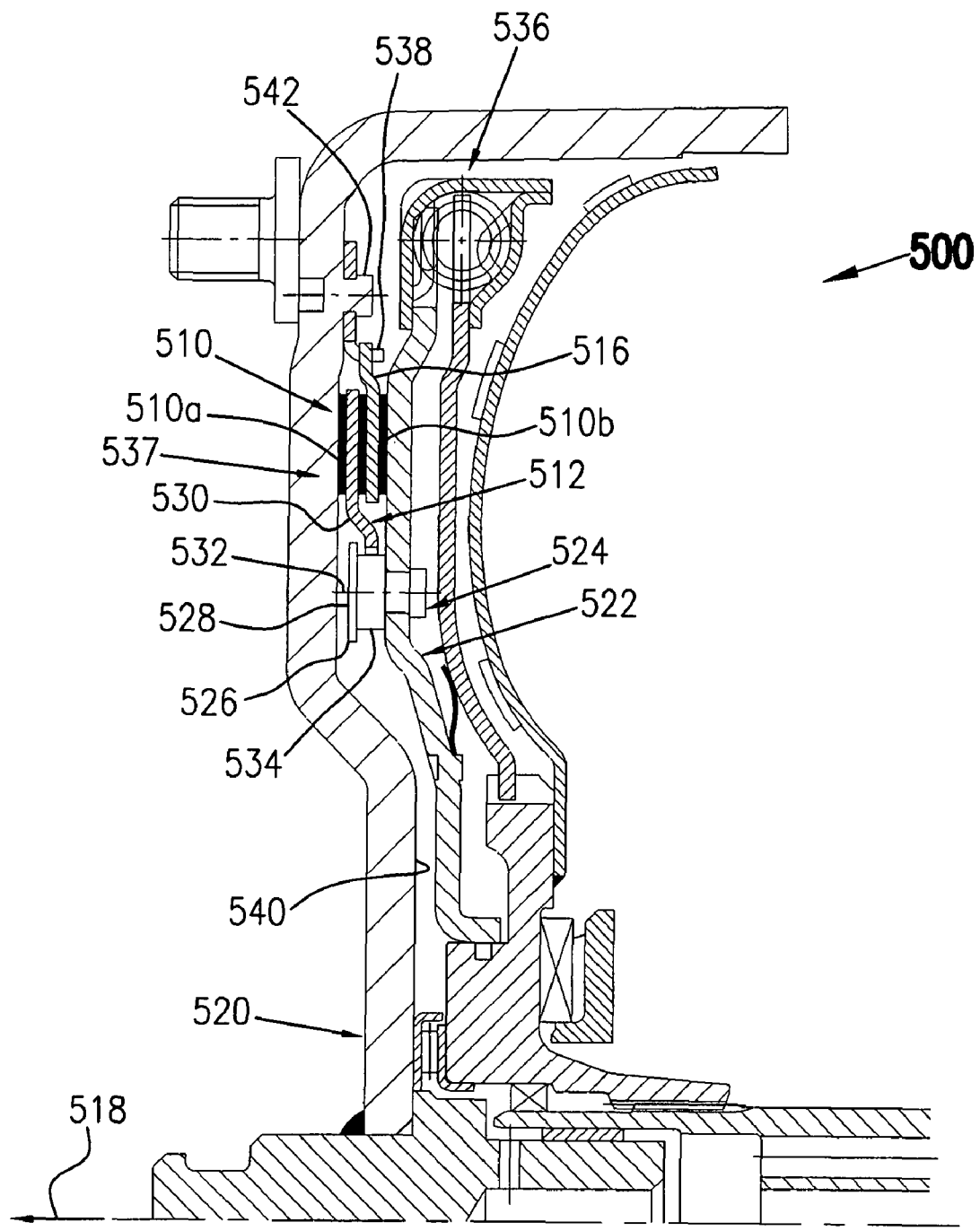
FIG. 13 is a cross sectional view of a present invention clutch assembly with an inner radial rivet restraining plate; and, FIG. 14 is a cross sectional view of a present invention clutch assembly with an interlocking joint restraining plate.

FIG. 13 is a cross sectional view of a present invention clutch assembly, clutch assembly 500 with an inner radial rivet restraining plate. Clutch assembly 500 includes annular friction elements 510, restraining plate 512, and plate 516. Restraining plate 512 is engageable with a portion of annular friction elements 510 and is arranged to restrict axial movement of at least a portion of annular friction elements 510, in particular in axial direction 518, as described below. Plate 516 is engageable with a portion of annular friction elements 510 and arranged to rotationally connect to cover 520. The discussion regarding plates and friction material in the description of FIG. 10 is applicable to friction material 510 and plates 512 and 516.

In general, annular friction elements 510 are arranged to frictionally engage cover 520 and pressure plate 522. For example, element 510a is arranged to engage cover 520 and element 510b is arranged to engage plate 522 when plate 522 is displaced in direction 518.

Assembly 500 includes axial protrusions 524 connected to pressure plate 522. The axial protrusions include limiting elements 526 at axial end 528. Protrusions 524, in particular limiting elements 526, are arranged to limit the axial movement of annular friction elements 510 axially away from pressure plate 522, that is, in direction 518. In some aspects, protrusions 524 are rivets and elements 526 are respective heads of the rivets. In some aspects, the rivets are formed separately from the pressure plate and connected to the pressure plate. In some aspects (not shown), the rivets are formed integrally with the pressure plate, for example, the rivets are extruded from the pressure plate.

In some aspects, restraining plate 512 is rotationally connected to protrusions 524 by forming outer circumferential segment 530 to compliment the shape of the protrusions, for example, forming recesses in segment 530 which engage protrusions 524. In some aspects, restraining plate 512 is rotationally connected to protrusions 524 by forming outer circumferential segment 530 to extend radially between the protrusions so that segment 530 and the protrusions engage during rotation of the segment or protrusions.

The configuration of segment 530 enables plate 516 to axially displace along segment 534 of the protrusions. In some aspects (not shown), the restraining plate is not rotationally connected to the protrusions, but is axially limited by the protrusions. For example, segment 530 extends sufficiently radially outward so that the segment is radially aligned with elements 526 (elements 526 restrict axial displacement in direction 518), but segment 530 does not extend radially outward enough to rotationally engage the protrusions.

Thus, plate 512 restricts the axial movement of the annular friction elements and plate 516 while enabling sufficient axial movement for the operation of assembly 500. That is, to enable the friction elements to engage to create a torque transmission path from cover 520 to damper 536. Also plate 512 is arranged to restrict movement of the annular friction elements, axially away (in direction 518) from pressure plate 522, to a maximum distance. The maximum distance is at least partially determined by the axial length of segment 534. Alternately stated, the restraining plate is arranged to limit disposition of the annular friction elements to a maximum axial distance from the pressure plate. Hence, sub-assembly 537, which includes friction elements 510 and plates 512 and 516, is axially restrained with respect to plate 522 and remains intact without engagement to cover 520, enabling the shipment of plate 522 (and any other components to which it is connected) and sub-assembly 537 for later assembly with a separate torque converter cover.

Plate 516 is arranged to rotationally connect to cover 520. In some aspects, segment 538 is located on inner surface 540 of the cover and plate 516 is formed to rotationally connect with segment 538. The segment can be connected to the cover by any means known in the art, including, but not limited to rivet 542. It should be understood that any means known in the art can be used to rotationally connect plate 516 and cover 520.

Figure 14:
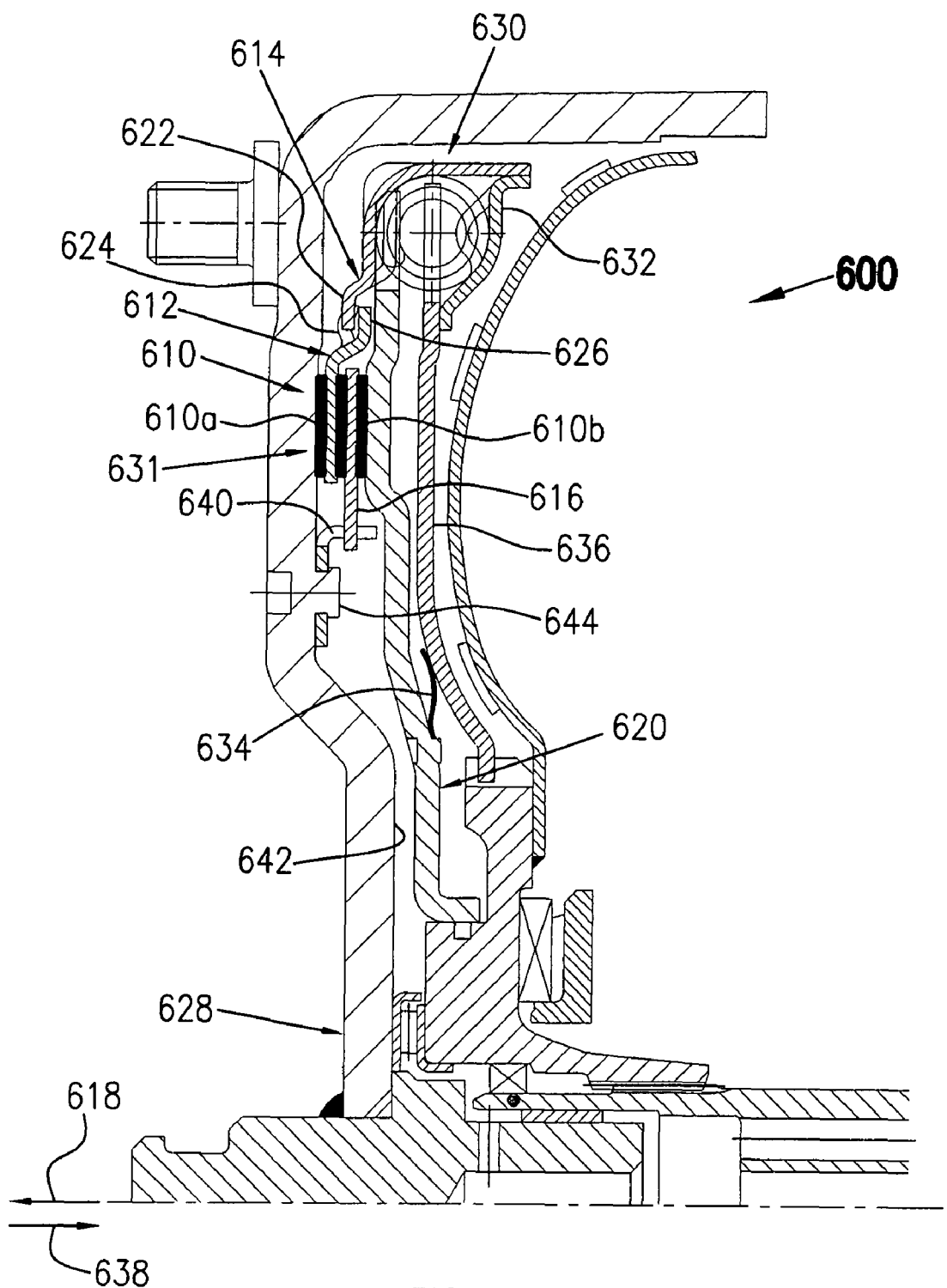

FIG. 14 is a cross sectional view of a present invention clutch assembly with an interlocking joint restraining plate. Clutch assembly 600 includes annular friction elements 610, restraining plate 612, overlap plate 614, and plate 616. Restraining plate 612 is engageable with a portion of annular friction elements 610 and is arranged to restrict axial movement of at least a portion of annular friction elements 610, in particular in axial direction 618, as described below. Plate 616 is engageable with a portion of annular friction elements 610 and arranged to rotationally connect to cover 628. The discussion regarding plates and friction material in the description of FIG. 10 is applicable to friction material 610 and plates 612 and 616.

Plate 614 axially overlaps plate 612 to limit the axial movement of at least a portion of the annular friction elements away from pressure plate 620. Plate 614 restricts the axial movement of the friction elements by limiting the axial movement of plate 612 away from the pressure plate. In some aspects, plate 612 is rotationally connected to plate 614. In some aspects, plate 614 includes at least one interlocking feature 622 and plate 612 includes at least one interlocking feature 624 rotationally connected with interlocking feature 622. Feature 622 axially overlaps segment 626 of plate 612, therefore, feature 622 acts as an axial stop for segment 626, and consequently, for plate 612. In some aspects, features 622 and 624 are a complimentary arrangement of splines. It should be understood that clutch assembly 600 is not limited to any particular respective number of interlocking features 622 or 624. It also should be understood that a present invention clutch assembly is not limited to any particular spacing, size, or configuration of interlocking features.

In general, annular friction elements 610 are arranged to frictionally engage cover 628 and pressure plate 620. For example, element 610a is arranged to engage cover 628 and element 610b is arranged to engage plate 620 when plate 620 is displaced in direction 618.

Thus, plate 612 restricts the axial movement of the annular friction elements and plate 616 while enabling sufficient axial movement for the operation of assembly 600. That is, to enable the friction elements to engage to create a torque transmission path from cover 628 to damper 630. Also, plate 612 is arranged to restrict movement of the annular friction elements, axially away (in direction 618) from pressure plate 620, to a maximum distance. The maximum distance is at least partially determined by the axial length of feature 622 and segment 626. Alternately stated, the restraining plate is arranged to limit disposition of the annular friction elements to a maximum axial distance from the pressure plate. Hence, sub-assembly 631, which includes friction elements 610 and plates 612 and 616, is axially restrained with respect to plate 620 and remains intact without engagement to cover 628, enabling the shipment of plate 620 (and any other components to which it is connected) and sub-assembly 631 for later assembly with a separate torque converter cover.

In some aspects, plate 614 is rotationally connected to plate 620. In some aspects, plate 632 is connected to plate 614. Elastically deformable element 634 urges plate 620 in direction 618 and reacts against flange 636 to urge the flange in direction 638. Then, plate 620 pushes axially against plate 614 and flange 636 pushes axially against plate 632 and hence, plate 624. The combined action of plate 620 and flange 636 axially stabilizes plate 614 and hence, plate 612.

Plate 616 is arranged to rotationally connect to cover 628. In some aspects, interlocking feature 640 is located on inner surface 642 of the cover and plate 616 is formed to interlock with the feature. In some aspects, the feature is a spline. The feature can be connected to the cover by any means known in the art, including, but not limited to rivet 644. It should be understood that any means known in the art can be used to rotationally connect plate 616 and cover 628.

Returning to FIGS. 10 and 11, it should be understood that a present invention clutch assembly is not limited to any particular number of openings in the pressure plate or axial segments of the restraining plate. It also should be understood that a present invention clutch assembly is not limited to any particular spacing, size, or configuration of openings in the pressure plate and axial segments of the restraining plate.

Returning to FIGS. 12 and 13, it should be understood that a present invention clutch assembly is not limited to any particular number of protrusions connected to the pressure plate or circumferential segments of the restraining plate. It also should be understood that a present invention clutch assembly is not limited to any particular spacing, size, or configuration of protrusions connected to the pressure plate or circumferential segments of the restraining plate.

It should be understood that a present invention clutch assembly is not limited to use with any particular torque converter and that a present invention clutch can be used with torque converters other than those shown in the figures.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A clutch assembly for a torque converter comprising:
   a plurality of annular friction elements;
   a pressure plate; and,
   a restraining plate engageable with at least a first portion of said plurality of annular friction elements and arranged to limit axial movement of at least a second portion of said plurality of annular friction elements to a maximum distance from said pressure plate and wherein:
   a portion of the restraining plate is axially aligned with the plurality of annular friction elements;
   the restraining plate is axially displaceable;
   said pressure plate further comprises an axial protrusion arranged to limit said axial movement of said at least a second portion of said plurality of annular friction elements away from said pressure plate; and, said axial protrusion is disposed radially outside of said plurality of annular friction elements.

2. The clutch assembly recited in claim 1, wherein said restraining plate is rotationally connected to said pressure plate.

3. The clutch assembly recited in claim 2, wherein said pressure plate further comprises an opening and wherein said restraining plate further comprises an axial segment disposed in said opening and arranged to contact said pressure plate to limit said axial movement of said at least a second portion of said plurality of annular friction elements away from said pressure plate.

4. The clutch assembly recited in claim 3, wherein said pressure plate further comprises a radial surface and said axial segment further comprises an end and wherein said end is arranged to contact said radial surface to limit said axial movement of said at least a second portion of said plurality of annular friction elements.

5. The clutch assembly recited in claim 3, wherein said axial segment is radially biased to limit said axial movement of said at least a second portion of said plurality of annular friction elements.

6. The clutch assembly recited in claim 5, wherein said axial segment is biased radially inward.

7. The clutch assembly recited in claim 1 wherein said restraining plate is rotationally connected to said axial protrusion.

8. The clutch assembly recited in claim 1, wherein said axial protrusion comprises a rivet with a head arranged to limit said axial movement of said restraining plate away from said pressure plate.

9. The clutch assembly recited in claim 1, wherein said axial protrusion is disposed radially inside of said plurality of annular friction elements.

10. The clutch assembly recited in claim 1, wherein said axial protrusion is integral to said pressure plate.

11. The clutch assembly recited in claim 1, wherein said axial protrusion is formed separately from said pressure plate and connected to said pressure plate.

12. The clutch assembly recited in claim 1, wherein said torque converter further comprises a cover and a friction element in said plurality of annular friction elements is arranged to frictionally engage said cover.

13. The clutch assembly recited in claim 1 further comprising a first plate engageable with said plurality of annular friction elements, wherein said torque converter further comprises a cover and said first plate is arranged to rotationally connect to said cover.

14. The clutch assembly recited in claim 1 wherein said plurality of annular friction elements further comprises a plurality of clutch plates.

15. A clutch assembly for a torque converter comprising:
a plurality of annular friction elements;
a pressure plate including an opening; and,
a restraining plate engageable with a first portion of said plurality of annular friction elements and having an axially disposed segment with an end, wherein said axially disposed segment is disposed in said opening to rotationally connect said restraining plate and said pressure plate and said end is arranged to contact said pressure plate to limit an axial movement of at least a second portion of said plurality of annular friction elements away from said pressure plate.

16. A clutch assembly for a torque converter comprising:
a plurality of annular friction elements;
a pressure plate; and,
a restraining plate engageable with at least a first portion of said plurality of annular friction elements and having a first interlocking feature; and,
a first plate rotationally connected to said pressure plate, axially overlapping said restraining plate, and having a second interlocking feature rotationally connected to said first interlocking feature, wherein said restraining plate is arranged to restrict axial movement of at least a second portion of said plurality of annular friction elements away from said pressure plate and said first plate is arranged to contact the restraining plate to limit an axial movement of said restraining plate away from said pressure plate.

* * * * *